Aug. 1, 1961  K. D. ELWICK  2,994,485
ROLLER MILL
Filed May 23, 1960
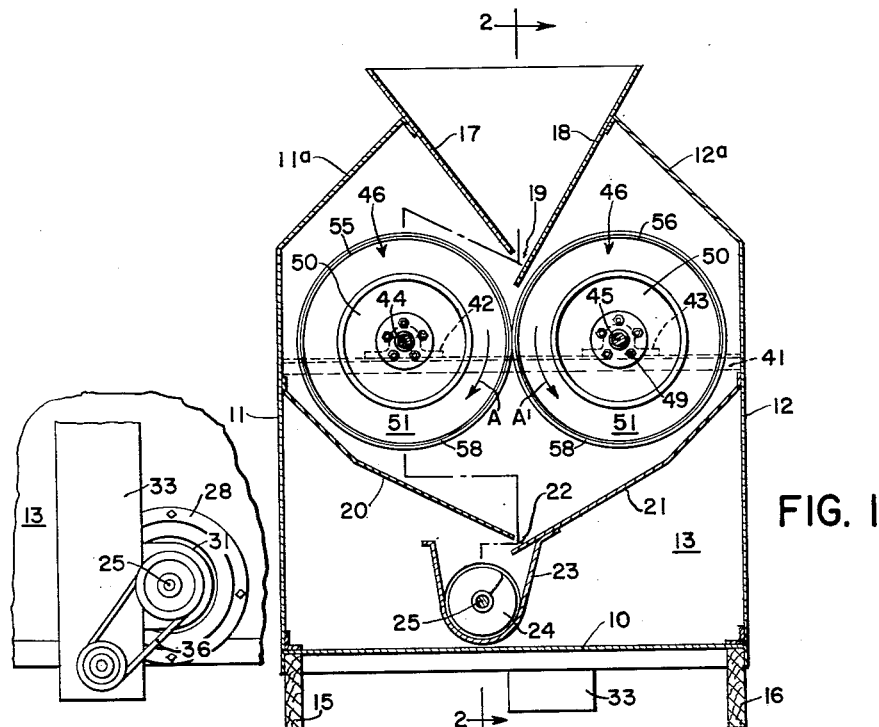
FIG. 1
FIG. 4
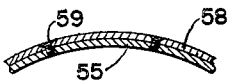
FIG. 3
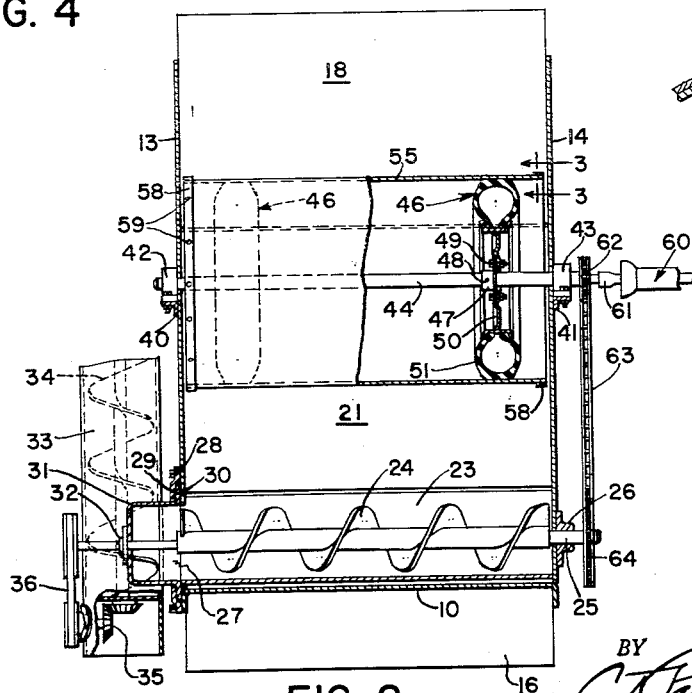
FIG. 2
INVENTOR.
KEITH D. ELWICK
ATTORNEYS

United States Patent Office 2,994,485
Patented Aug. 1, 1961

2,994,485
ROLLER MILL
Keith D. Elwick, Vinton, Iowa, assignor to Hawk Bilt Manufacturing Corporation, Vinton, Iowa, a corporation of Iowa
Filed May 23, 1960, Ser. No. 30,959
7 Claims. (Cl. 241—102)

This invention relates to a roller mill for grinding grain and more particularly to the specific construction of the rolls provided in the mill.

It is the main purpose of the present invention to provide a new and novel type of roller mill which is simple in design and has constructed therein features which protect the rolls of the mill against damage due to foreign objects of a non-grindable character which might pass through the mill.

More specifically, it is the purpose of the present invention to construct the roll in the aforementioned roller mill with an outer cylindrical shell having internal supports comprising inflatable torus members carried on the driving or supporting shaft for the rolls. For practical purposes, the torus members may be tires which have been discarded for traction purposes. By providing the torus or tire members as the basic support for the outer shell, a large object such as a board, stone or metallic piece may pass between the adjacent sides of the rolls and the tire will yield sufficiently to permit the foreign object to pass.

A further object of the invention is to incorporate with the above-described type of rolls, a spacing means which includes an annular ring or rings positioned on the outer surface of the shells which are relatively thin and are removable and replaceable. The purpose of the rings is to maintain proper spacing between the rolls. For example, should it be desired to mill corn, a certain size of ring will be used to maintain proper spacing for milling corn. Should it be desired to mill oats, normally a thinner ring will be used so as to place the surface of the rollers closer together. Generally two or three sizes of rings will be sufficient to maintain proper spacing for almost any type of grinding. Other objects and advantages of the present invention will become apparent to those skilled in the art as the nature of the invention is better understood from the following description and as shown in the accompanying drawings.

FIG. 1 is an end view of the milling machine with one end of the housing removed to show the internal mechanism.

FIG. 2 is a partial sectional view taken substantially along the line 2—2 of FIG. 1.

FIG. 3 is an enlarged sectional view taken substantially along the line 3—3 of FIG. 2.

FIG. 4 is an end view of the lower portion of one end of the milling machine.

Referring now to the drawings, there is provided a mill housing which includes a floor structure 10, upright and oppositely disposed sides 11, 12 and oppositely disposed upright end plates 13, 14. The floor 10 as well as the entire housing is supported on ground supports or stands 15, 16. The side walls 11, 12 converge inwardly toward one another at their upper ends 11a, 12a. A material feeding means in the form of a hopper formed by converging fore-and-aft disposed hopper plates 17, 18, is positioned at the upper end of the housing and opens upwardly to receive materials to be ground in the milling unit. The panel or plate 17 has its lower end spaced from the face of the opposite panel or plate 18 to form an opening 19 which feeds material directly into the grinding area.

Positioned beneath the grinding mechanism is a second set of panels 20, 21 which are fixed to side walls 11, 12 and converge inwardly and downwardly. The panels extend between the ends 13, 14 and as mentioned previously, form a hopper for collecting the ground materials gravitating from the grinding or reducing mechanism. Panel 20 terminates spacedly from the upper face of panel 21 to define an opening 22 through which the ground material may descend. Positioned directly beneath the opening 22 is an auger trough 23 which carried a longitudinally and horizontally disposed auger 24 supported on an auger drive shaft 25 which extends outwardly at opposite ends of the housing. A journal 26 is provided on the end wall 14 to receive the drive end of the shaft 25. The opposite end of the shaft 25 passes through a discharge opening 27 in the wall 13. The opening is slightly larger than the diameter of the flight on the auger 24. An annular ring 28, bolted to the outer face of the end wall 13, surrounds the opening 27 and is provided with an annular lip 29 which is spaced from the surface of the end wall 13 to receive an annular flange 30 of a cup-shaped swivel 31. As is apparent from viewing FIG. 2, the internal opening of the cup-shaped member 31 is such as to form an extension of the auger trough 23. The cup-shaped member 31 carries a journal 32 on which is supported the end of the auger drive shaft 25. The cup-shaped member 31, may, therefore, swivel about the axis of the shaft 25 through means of the lip 29 and the underlying flange 30. The cup-shaped member 31 has integral therewith a vertically disposed auger housing 33. An auger, not shown, but indicated in dotted representation at 34, is contained in the auger housing 33. The latter auger is driven by means of a bevel gear transmission 35 disposed at the lower end of the auger housing 33 which in turn is driven by a belt drive 36 extending from the end of the horizontal drive shaft 25. The auger housing 33 has an inlet into the cup member 31 so that material may move from the horizontal auger trough 23 into the vertical auger housing 33.

Referring now specifically to the material reducing or grinding mechanism, there is provided on the end walls 13, 14 a pair of angle iron members 40, 41 respectively welded or otherwise fixed to the walls. Mounted on the angle iron members 40, 41 are journal blocks 42, 43. Carried in the journal blocks 42, 43 is a pair of roll supporting shafts 44, 45, both of which extend between the end walls 13, 14.

Fixed to the shafts 44, 45 are identical wheel members 46. The wheel members 46 may be a conventional type tire and wheel mounting taken from scrap automobiles or may be manufactured specifically for the purpose here described. In any respect, the wheel includes a central hub portion 47 keyed, as at 48, to the respective shaft and having a radial flange on which is bolted at 49 a wheel rim 50. The wheel rim 50 carries an inflatable torus member 51 which may be a conventional type tire. As indicated in the drawings, there are two axially spaced wheels 46 on each shaft 44, 45 with each being relatively close to respective end walls 13, 14.

Carried on the surface or periphery of the wheels 46 are a pair of metallic cylindrical drums 55, 56 extending substantially the length of the expanse between the end walls 14, 13. The shafts 44, 45 and consequently the drums or cylinders 55, 56 are so positioned relative to one another that the drums 55, 56 generally lie closely adjacent to one another and the adjacent sides thereof will define the material grinding area beneath the hopper plates 17, 18. This is evident from viewing FIG. 1.

Adjacent opposite ends and on the surface of the drums 55, 56 are rings 58. The rings 58 are fixed to the drums by means of screws 59 which fit in counter-sunk openings in the rings 58. The rings 58 will ride against either the surface of the opposite drum or against a ring on the adjacent drum for purposes of maintaining a minimum spacing between the drums. The screws 59 permit the rings 58 to be removed and replaced and consequently rings of different thickness may be applied to the surface of the drums 55, 56 so that the spacing between the drums may be varied depending upon the type of material to be ground.

The drive mechanism for the drums 55, 56 extends from a main drive shaft assembly, as indicated in its entirety by the reference numeral 60. The latter may be driven from the power take-off shaft of a tractor or by other independent power means. The drive shaft assembly 60 is connected to a projecting end of the roll shaft 44 through a universal type joint 61. Also supported on the projecting end of the shaft 44 is a sprocket 62 over which is mounted a chain 63 extending downwardly to a sprocket 64 carried on the auger drive shaft 25. Consequently the milling drum 55 will be driven as well as the augers 24, 34 directly from the drive shaft assembly 60. It will be noted that only one roll or drum is driven. Generally it is anticipated that the other drums will be driven through frictional effect created by the materials ground in the grinding area between the adjacent sides of the drums 55, 56. The shaft 44 is driven in such a manner that the adjacent sides of the drums 55, 56 are driven downwardly as indicated by the arrows A and $A_1$.

The roller mill as above described operates in the conventional manner by passing material between the adjacent drums 55, 56 where it is ground and generally reduced. The special feature of the present structure lies in the fact that should a large foreign object such as a bolt, board, stone or such, pass through the opening 19 and between the surface of the drums 55, 56, the torus members 51, will yield sufficiently to pass the foreign object through the grinding or reducing area without injury to the drums 55 or 56. Also, once they have yielded to permit passage of the foreign object they will immediately resume normal positioning of the drums relative to one another. Also, by providing yieldable-type undersupport for the drums, the drums will be more or less self-adjusting to permit the different size rings to be inserted on the ends of the drums. In this respect, it should be understood that the variation in the thickness in the rings although critical will be relatively small and consequently the small degree of variation may be readily accommodated through the yielding of the torus members or tires 51.

While only one form of the invention has been shown and described, it should be recognized that other forms and variations will occur to those skilled in the art. Therefore, while the present description was given for the purpose of clearly and concisely illustrating the principles of the invention, it was not the intention to limit or narrow the invention beyond the broad concept set forth in the appended claims.

What is claimed is:

1. A roller mill comprising: an upright housing structure having an upper material inlet and a lower material outlet; a pair of horizontal rotatable shafts generally parallel to one another journaled on the housing structure; axially spaced inflatable torus members mounted on each of the shafts; a pair of hollow metal drums concentric with the respective shafts and supported externally respective the torus members, said shafts, torus members, and drums being disposed whereby the adjacent sides of the drums are proximate to one another to define a grinding area of the roller mill generally beneath the material inlet; drive means connected to at least one of the shafts for effecting rotation of the drums whereby the proximate sides thereof move downwardly; hopper means beneath the drums for collecting material gravitating from the drums; and means discharging material from the hopper through the outlet.

2. A roller mill comprising: an upright housing structure having an upper material inlet and a lower material outlet; a pair of horizontal rotatable rollers generally parallel to one another and journaled on the housing structure, said rollers having opposed adjacent sides closely proximate and defining a grinding area therebetween; at least one of said rollers being composed of a roller shaft, axially spaced inflatable torus members mounted on the shaft, and a hollow metal drum concentric with the shaft and supported externally respective the torus members; drive means connected to at least one of the rollers for effecting rotation thereof whereby the proximate sides thereof move downwardly; hopper means beneath the rollers for collecting material gravitating from the rollers; and means discharging material from the hopper and through the outlet.

3. A roller mill comprising: an upright housing structure having a material inlet and a material outlet; horizontal shafts rotatable about parallel axes and journaled on the housing structure; metal cylinders concentric with the respective shafts; means supporting the cylinders on the shafts including axially spaced torus members fixed to the shafts and having their peripheral surfaces engaging the respective cylinders internally, said shafts, torus members, and cylinders being disposed whereby the adjacent sides of the cylinders are proximate to one another to define a grinding area of the roller mill; drive means connected to at least one of the shafts for effecting rotation of the cylinders whereby the proximate sides thereof move downwardly; and means beneath the cylinders for collecting maerial gravitating from the cylinders.

4. A roller mill comprising: an upright housing structure having a material inlet and a material outlet; shafts rotatable about parallel axes and journaled on the housing structure; grinding cylinders concentric with the respective shafts; means supporting the cylinders on the shafts including axially spaced torus members fixed to the shafts and having their peripheral surfaces engaging the respective cylinders internally, said shafts, torus members and cylinders being disposed whereby the adjacent sides of the cylinders are proximate to one another to define a grinding area; drive means effecting rotation of the cylinders whereby the proximate sides thereof move in one direction; and means on the housing for collecting material dispensed from the grinding area.

5. A roller mill comprising: an upright housing structure having an upper material inlet and a lower material outlet; a pair of horizontal rotatable shafts generally parallel to one another journaled on the housing structure; torus members mounted on the shafts inflatable and deflatable to expand and retract radially; a pair of metal drums concentric with the respective shafts and supported externally respective the torus members, said shafts, torus member and drums being disposed whereby the adjacent sides of the drums are proximate to one another to define a grinding area of the roller mill generally beneath the material inlet; drive means connected to at least one of the shafts for effecting rotation of the drums whereby the proximate sides thereof move downwardly; and hopper means beneath the drums for collecting material gravitating from the drums.

6. A roller mill comprising: an upright housing structure having a material inlet and a material outlet; shafts rotatable about parallel axes and journaled on the housing structure; grinding cylinders concentric with the respective shafts; means supporting the cylinders on the shafts including axially spaced torus members fixed to the shafts and having their peripheral surfaces engaging the respective cylinder internally, said shafts, torus members, and cylinders being disposed whereby the adjacent sides of the cylinders are proximate to one another to define a grinding area; drive means effecting rotation of the cylinders; and a peripheral spaced element extending radially from the surface of at least one cylinder and engageable with the other cylinder for maintaining a minimum spacing between the cylinders.

7. The invention defined in claim 6 in which the spacer element is a ring on the cylinders which is detachable therefrom.

References Cited in the file of this patent

UNITED STATES PATENTS

| | | |
|---|---|---|
| 2,582,872 | Krengel | Jan. 15, 1952 |
| 2,879,007 | Persyn | Mar. 24, 1959 |

FOREIGN PATENTS

| | | |
|---|---|---|
| 250,117 | Great Britain | Apr. 8, 1926 |
| 415,321 | Great Britain | Aug. 23, 1934 |
| 507,558 | Belgium | Dec. 31, 1951 |